(12) United States Patent
Hosp et al.

(10) Patent No.: US 10,657,594 B2
(45) Date of Patent: May 19, 2020

(54) METHOD AND SYSTEM FOR INTELLIGENT ROUTING OF INSIGHTS

(71) Applicant: Mastercard International Incorporated, Purchase, NY (US)

(72) Inventors: Adam Kenneth Hosp, Lake St. Louis, MO (US); Oran Cummins, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 598 days.

(21) Appl. No.: 15/386,367

(22) Filed: Dec. 21, 2016

(65) Prior Publication Data

US 2018/0174236 A1    Jun. 21, 2018

(51) Int. Cl.
G06Q 40/04      (2012.01)
G06Q 30/02      (2012.01)

(52) U.S. Cl.
CPC ......... G06Q 40/04 (2013.01); G06Q 30/0201 (2013.01)

(58) Field of Classification Search
CPC .................................. G06Q 10/00–50/00
USPC .............................. 705/7.11–7.42
See application file for complete search history.

(56) References Cited

U.S. PATENT DOCUMENTS

| | | | |
|---|---|---|---|
| 9,524,504 B2 * | 12/2016 | Villars ................ | G06Q 10/00 |
| 9,767,500 B2 * | 9/2017 | Cummins .......... | G06Q 30/0623 |
| 10,102,557 B1 * | 10/2018 | Brown ............... | G06Q 30/0635 |
| 2003/0033237 A1 * | 2/2003 | Bawri .................... | G06Q 30/02 705/37 |
| 2008/0201731 A1 * | 8/2008 | Howcroft ............... | H04H 60/46 725/13 |
| 2010/0274669 A1 * | 10/2010 | Carlson ............. | G06Q 30/0261 705/14.58 |
| 2013/0024242 A1 * | 1/2013 | Villars .................. | G06Q 10/00 705/7.33 |
| 2013/0073340 A1 * | 3/2013 | Alex ...................... | G06Q 30/02 705/7.33 |
| 2013/0282526 A1 * | 10/2013 | Cummins .......... | G06Q 30/0623 705/26.61 |
| 2014/0019287 A1 * | 1/2014 | Carlson ............. | G06Q 30/0261 705/26.3 |

(Continued)

*Primary Examiner* — Alan S Miller
(74) *Attorney, Agent, or Firm* — Buchanan Ingersoll & Rooney PC

(57) ABSTRACT

A method for providing insights based on merchant bidding includes: storing a plurality of transaction data entries, each including a merchant identifier and transaction data; receiving merchant bids, each being received from a different merchant and including a bid amount and corresponding merchant identifier; identifying a transaction metric based on the transaction data included in each transaction data entry; identifying a propensity to transact for each corresponding merchant identifier based on the transaction data included in each transaction data entry that includes the respective corresponding merchant identifier; determining a winning bid of the plurality of merchant bids based on a combination of the propensity to transact for the included corresponding merchant identifier and the included bid amount; and transmitting the account identifier included in the account profile to the merchant from which the winning bid was received.

16 Claims, 5 Drawing Sheets

(56) References Cited

U.S. PATENT DOCUMENTS

| | | | | |
|---|---|---|---|---|
| 2014/0156420 A1* | 6/2014 | Chow | ................ | G06Q 30/0275 |
| | | | | 705/14.71 |
| 2014/0244353 A1* | 8/2014 | Winters | ................ | G06Q 30/02 |
| | | | | 705/7.29 |
| 2015/0242892 A1* | 8/2015 | Priebatsch | ......... | G06Q 30/0255 |
| | | | | 705/14.53 |
| 2015/0348072 A1* | 12/2015 | Goodyear | .......... | G06Q 30/0204 |
| | | | | 705/7.33 |
| 2016/0239853 A1* | 8/2016 | Cummins | .......... | G06Q 30/0201 |
| 2016/0300257 A1* | 10/2016 | Triano | ............... | G06Q 30/0211 |

\* cited by examiner

METHOD AND SYSTEM FOR INTELLIGENT ROUTING OF INSIGHTS

FIELD

The present disclosure relates to the routing of insights on target individuals to an entity, specifically the routing of insights to one of a plurality of entities associated with an individual based on a combination of entity bidding and the individual's propensity for continued interaction with each entity.

BACKGROUND

Entities that are engaged in commerce are often interested in finding out as much information about their customers as they can. Such information can be useful in earning repeat business, finding and enticing new customers, and ensuring higher customer satisfaction, all of which may lead to increased revenue and returns. For the customers, merchants and other entities that learn more about them may lead to the availability of more attractive deals, offers, and other benefits to the customer, encouraging the customer to share their information with the entities. As a result, it can be beneficial to both entities and their customers for an entity to learn more about its customers.

However, many customers may transact with a vast number of entities. In such cases, there may be a significant number of entities that desire to learn more about a customer, which the customer may be uncomfortable with. In addition, a customer may transact with several entities very rarely, or even just once, with little to no intention of returning to the entity for future transactions, such as due to location, bad customer service, etc. In such cases, there may be little advantage to the entity learning more about the consumer. Thus, traditional methods for distributing insights about customers to associated entities often result in a distribution of data that is far too wide for customer comfort, and result in data being distributed to entities that may find little to no use for such data. However, presenting insights about select consumers to those most likely to benefit from them presents technological challenges, particularly on a large scale on tens or hundreds of thousands of consumers, particularly in an automated fashion.

Accordingly, there is a need for a technological solution for providing insights on customers of entities to only entities that desire such information and based on the propensity for the customer to continually interact with the entity, to provide greater consumer benefit and a higher rate of return on the usage of such information.

SUMMARY

The present disclosure provides a description of systems and methods for providing insights based on merchant bidding. Merchants that have interacted with a consumer on previous transactions have the opportunity to bid on receiving insights about the consumer, such that the consumer insights are not broadly shared, but are instead shared with a single (or other limited number) merchant bidder, as an optional feature. The winning merchant is identified not based purely on the bid, but also the likelihood that the consumer will transact again with that merchant in the future, based on their previous transactional history. As a result, only merchants where there is a high rate of return for that specific consumer will receive the insights. In addition, the insights are shared only once they reach a predetermined threshold that indicates the consumer is likely to transact soon. Thus, the methods and systems result in consumers being connected to merchants with whom they want to transact, that want to transact with them, and when the consumer is ready to transact, providing for greater convenience and effectiveness to both consumers and merchants.

A method for providing insights based on merchant bidding includes: storing, in an account database of a processing server, an account profile, wherein the account profile includes at least an account identifier and a plurality of transaction data entries related to payment transactions, each transaction data entry including at least a merchant identifier and transaction data; receiving, by a receiving device of the processing server, a plurality of merchant bids, wherein each merchant bid is received from a different merchant and includes at least a bid amount and a corresponding merchant identifier; identifying, by an analytical module of the processing server, a transaction metric based on at least the transaction data included in each transaction data entry stored in the account profile, wherein the transaction metric is at least a predetermined value; identifying, by the analytical module of the processing server, a propensity to transact for each corresponding merchant identifier included in the plurality of merchant bids based on at least the transaction data included in each transaction data entry stored in the account profile that includes the respective corresponding merchant identifier; determining, by a determination module of the processing server, a winning bid of the plurality of merchant bids based on at least a combination of the propensity to transact for the included corresponding merchant identifier and the included bid amount; and electronically transmitting, by a transmitting device of the processing server, at least the account identifier included in the account profile to the merchant from which the winning bid was received.

A system for providing insights based on merchant bidding includes: an account database of a processing server configured to store an account profile, wherein the account profile includes at least an account identifier and a plurality of transaction data entries related to payment transactions, each transaction data entry including at least a merchant identifier and transaction data; a receiving device of the processing server configured to receive a plurality of merchant bids, wherein each merchant bid is received from a different merchant and includes at least a bid amount and a corresponding merchant identifier; an analytical module of the processing server configured to identify a transaction metric based on at least the transaction data included in each transaction data entry stored in the account profile, wherein the transaction metric is at least a predetermined value, and identify a propensity to transact for each corresponding merchant identifier included in the plurality of merchant bids based on at least the transaction data included in each transaction data entry stored in the account profile that includes the respective corresponding merchant identifier; a determination module of the processing server configured to determine a winning bid of the plurality of merchant bids based on at least a combination of the propensity to transact for the included corresponding merchant identifier and the included bid amount; and a transmitting device of the processing server configured to electronically transmit at least the account identifier included in the account profile to the merchant from which the winning bid was received.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
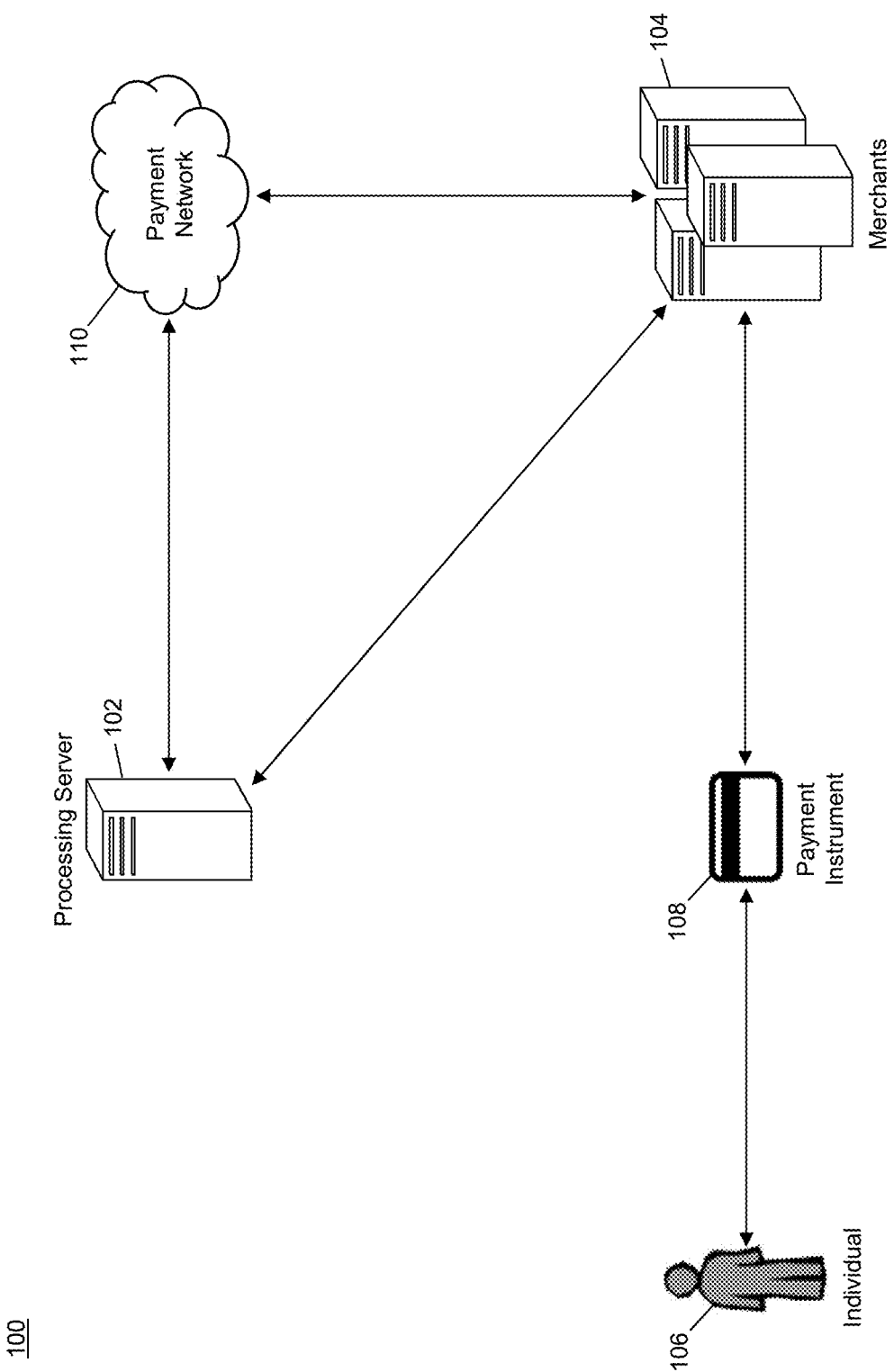
FIG. 1 is a block diagram illustrating a high level system architecture for providing insights based on merchant bidding and individual propensities to transact in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Providing Insights Based on Merchant Bidding

FIG. 1 illustrates a system 100 for the providing of insights associated with an individual to one of a plurality of merchants based on merchant bidding, where a merchant is identified to receive insights based on a combination of their associated bid and the related individual's propensity to transact with that merchant.

The system 100 may include a processing server 102. The processing server 102, discussed in more detail below, may be configured to providing insights to merchants 104 related to an individual 106 identified as a prior customer of each of the merchants 104. The processing server 102 may be configured to identify when the individual 106 may be likely to transact again or otherwise meets criteria of interest to the merchants 104, and may provide the merchants 104 with an opportunity to bid on the receipt of insights about the individual 106, where the winning merchant 104 may be decided upon by the processing server 102 based on a combination of their bid and the likelihood that the individual 106 will transact with that merchant 104.

In the system 100, an individual 106 may conduct payment transactions with a plurality of different merchants 104. For each payment transaction, the individual 106 may present a payment instrument 108 to convey payment details to the merchant 104, where the payment details are associated with a transaction account for which the individual 106 is authorized that is used to fund the payment transaction. A merchant 104 may read or otherwise receive the payment details from the payment instrument 108 and include the details in transaction data that is submitted to a payment network 110 for processing of the payment transaction. Transaction data may be submitted directly to the payment network 110 from a merchant 104 or via one or more intermediate entities, such as acquiring financial institutions or gateway processors.

The payment network 110 may receive transaction data, including payment details, for each payment transaction to be processed thereby via payment rails associated with the payment network 110. In some embodiments, transaction data may be stored in a transaction message that is submitted to the payment network 110 via the associated payment rails. Transaction messages may be specially formatted data messages that are formatted pursuant to one or more standards governing the exchange of financial transaction messages, such as the International Organization of Standardization's ISO 8583 or 20022 standards. Transaction messages may be generated by merchants 104 or by intermediate entities through which the transaction data is transmitted, such as acquiring institutions. Each transaction message may include a message type indicator indicative of a type of the transaction message (e.g., authorization request, authorization response, clearing record, etc.) and a plurality of data elements configured to store the transaction data, such as a data element configured to store a transaction amount, a data element configured to store a merchant identifier associated with the involved merchant 104, data elements configured to store the payment details, etc. Transaction data that may be stored in a transaction message or otherwise conveyed for processing of a payment transaction may include a transaction amount, transaction time, transaction date, currency type, merchant identifier, merchant name, geographic location, issuer data, acquirer data, product data, payment details (e.g., primary account number, name, expiration date, security code, transaction counter, payment cryptogram, etc.), consumer data, offer data, reward data, loyalty data, etc.

The payment network 110 may receive a transaction message or otherwise receive transaction data for each transaction to be processed. The payment network 110 may then process each transaction using traditional methods and systems, which may include, for instance, forwarding authorization requests to issuing financial institutions associated with transaction accounts used to fund payment transactions, receiving authorization responses therefrom, and forwarding authorization responses to acquiring financial institutions. As part of the processing of each payment transaction, the merchant 104 may be notified if the payment transaction was approved or denied, and may finalize the exchange with the individual 106 accordingly.

In the system 100, the processing server 102 may receive transaction data for each payment transaction involving the individual 106 that was approved and successfully processed. In some embodiments, individual 106 may provide permission to the processing server 102 for the receipt of transaction data associated therewith. In some cases, the processing server 102 may not receive any personally identifiable information associated with the individual 106 when receiving transaction data. For instance, the payment details used in a payment transaction may be replaced by an anonymized account identifier, which may be a hash of the payment details or data included therein, a random or pseudo-random value assigned to the related transaction account, or other suitable means of anonymizing or otherwise obscuring any data that may be identifiable of the individual 106.

The processing server 102 may receive transaction data for a plurality of payment transactions involving an individual 106 and may store the data in an account profile, discussed in more detail below, related to the individual 106 and the transaction account. The processing server 102 may be configured to identify consumer insights for the individual 106 based on the transaction data for the payment transactions involving the individual 106. The consumer insights may be comprised of a plurality of transaction metrics that may provide insights into the individual's past transaction behavior and potential future transaction behavior as a result. Transaction metrics may include, for example, propensities for the individual 106 to transact in a given time period, at a given geographic location, with a given merchant, in a given merchant industry, for a given transaction amount, for a given product, for a given product category, etc., or a combination thereof.

For instance, the processing server 102 may identify an individual's propensity to spend more than $50 on sporting goods in a single transaction in the next 30 days among other transaction metrics. Each transaction metric may be based on related transaction data for each of the payment transactions involving the individual 106. For instance, in the above transaction metric, the propensity may be identified based on the transaction amount of past transactions involving sporting goods merchants and the frequency of such transactions. For example, if the individual 106 regularly shops at sporting goods vendors, but usually spends well below $50, the propensity may be low, but if the individual 106 typically spends above $50 and goes to a sporting goods merchant every three weeks, the propensity may be very high, especially if the last such transaction was twenty days prior.

Each of the plurality of merchants 104 with whom the individual 106 has transacted may place bids to receive insights associated with the individual 106. Each merchant 104 may submit a bid to the processing server 102 using a suitable communication network and method. In one embodiment, the processing server 102 may provide an application programming interface (API) for use by the merchants 104 in submitting bids. In another embodiment, the processing server 102 may operate or otherwise be associated with a web page that is used to submit bids. In yet another embodiment, a specialized application program may be executed on computing devices of merchants 104 that are used to submit bids to the processing server 102 via a suitable communication channel. Each merchant bid may include at least merchant identifier and a bid amount. The merchant identifier may be a unique identification value associated with the submitting merchant 104 that is used in payment transactions involving the merchant 104. The bid amount may be an amount of money or other currency or value that the merchant 104 is willing to spend or otherwise expend to receive the consumer insights.

In some embodiments, each merchant bid may specify a specific consumer insight. For instance, the processing server 102 may be configured to identify a plurality of different transaction metrics for the individual 106, where merchants 104 may bid on specific transaction metrics that are relevant to the interests of the merchant 104. For example, in the above case, sporting goods merchants 104 may be interested in the individual's propensity to spend over $50 in the next 30 days on sporting goods, while other merchants 104 may have no interest in such information, and so the merchant bids submitted by the sporting goods merchants 104 may indicate the transaction metric accordingly.

The processing server 102 may receive the merchant bids and may identify, for each of the submitting merchants 104, the individual's propensity to transact with the respective merchant 104. The individual's propensity to transaction with a merchant 104 may be based on transaction data for payment transactions involving that merchant 104, which may be identified via the associated merchant identifier (e.g., parsed from the corresponding merchant bid). In some instances, the individual's propensity to transact at each merchant 104 may have been previously identified as part of the identification of transaction metrics, and may be identified accordingly. In some cases, the processing server 102 may identify a new or updated propensity to transact with each submitting merchant 104 when a new merchant bid is received from that merchant 104, regardless of previous identification (e.g., to take into account any transactions conducted by the individual 106 since prior identifications of the transaction metric). In some cases, the propensity to transact with a merchant 104 may have a specified period of time, such as a propensity to transact in the next 30 days. In instances where the merchants 104 are bidding on a transaction metric that involves a specific spending amount (e.g., at least $50), the merchant propensities may be subject to the same spending amount, such as the likelihood that the individual 106 will spend at least $50 at that merchant 104 in the next 30 days.

Once merchant bids have been received and merchant propensities identified, the processing server 102 may select a winning bid of the merchant bids. The winning bad may be identified based on a combination of at least the bid amount for each bid and that individual's propensity to transact with that merchant 104. For example, a first merchant 104 may bid a large amount, but may not win the bid if the individual 106 is very unlikely to transact with that merchant 104 again. The weighting of each criterion may be based on feedback received by the processing server 102 from winning merchants 104 and from individuals 106. For instance, the processing server 102 may initially assign weight values to the bid amount and the propensity, which may be adjusted through feedback. For example, the processing server 102 may calculate a score for each merchant bid by adding the bid amount multiplied with a first weight value to the merchant propensity multiplied with a second weight value, where the highest score is the winning bid, and may adjust the weight values depending on feedback received from winning merchants (e.g., success rates of provided transaction metrics). In some cases, additional criteria may be used. For instance, the processing server 102 may also consider the geographic location of the individual 106 and/or the merchant 104, consumer rating of the merchant 104, pricing for each merchant 104 (e.g., if a specific product is being considered), or other suitable criteria.

The processing server 102 may electronically transmit the transaction metric associated with the bid to the merchant 104 associated with the winning bid (e.g., identified via their merchant identifier). The merchant 104 may then reach out to the individual 106 as a former customer 106 regarding the transaction metric. For instance, in the above example, a sporting goods merchant 104 may advertise to the individual 106, provide an offer to the individual 106, or otherwise communicate with the individual 106 to entice them to transact with the merchant 104, knowing that the individual 106 is likely to spend over $50 on sporting goods very soon.

In some embodiments, the processing server 102 may distribute transaction metrics when a transaction metric reaches a predetermined value or threshold. For instance, the processing server 102 may identify a score between 0 and 100 for each transaction metric, where a higher number indicates a higher propensity with respect to the corresponding transaction metric. For example, in the above case, a higher score may indicate a higher likelihood that the individual 106 will spend over $50 on sporting goods in the next 30 days. In some cases, the propensity may be a percentage likelihood (e.g., the individual has a 90% chance to spend over $50 on sporting goods in the next 30 days). The processing server 102 may distribute a transaction metric when the propensity for the transaction metric reaches or exceeds a predetermined value. For instance, in the above example, the processing server 102 may distribute the individual's transaction metric regarding sporting goods to the winning merchant 104 when the individual's propensity is over 75. In some such instances, the processing server 102 may wait to identify a winning bid until the predetermined value is met, such as to ensure that the individual's updated transaction history is incorporated when identifying merchant propensities. In some embodiments, merchants 104 may bid on a transaction metric for multiple threshold levels, such as one bid for a 50% propensity and another bid for an 80% propensity.

The methods and systems discussed herein may enable consumer insights to be shared with merchants 104 only in cases where both the merchant 104 and individual 106 are interested in each other, which may lead to higher conversion rates than existing systems. In addition, the use of bidding and selection of a winning bid can ensure that the individual's information is not distributed to more than a select number of merchants 104, which may protect consumer privacy and security, while also ensuring that the individual's transaction metrics are only distributed to the most interested merchants 104. The use of transaction propensities for merchants 104 may also ensure that merchants 104 will only receive transaction metrics when there is a strong chance of receiving a return on such data, providing higher utility and convenience to merchants 104.

Processing Server

Figure 2:
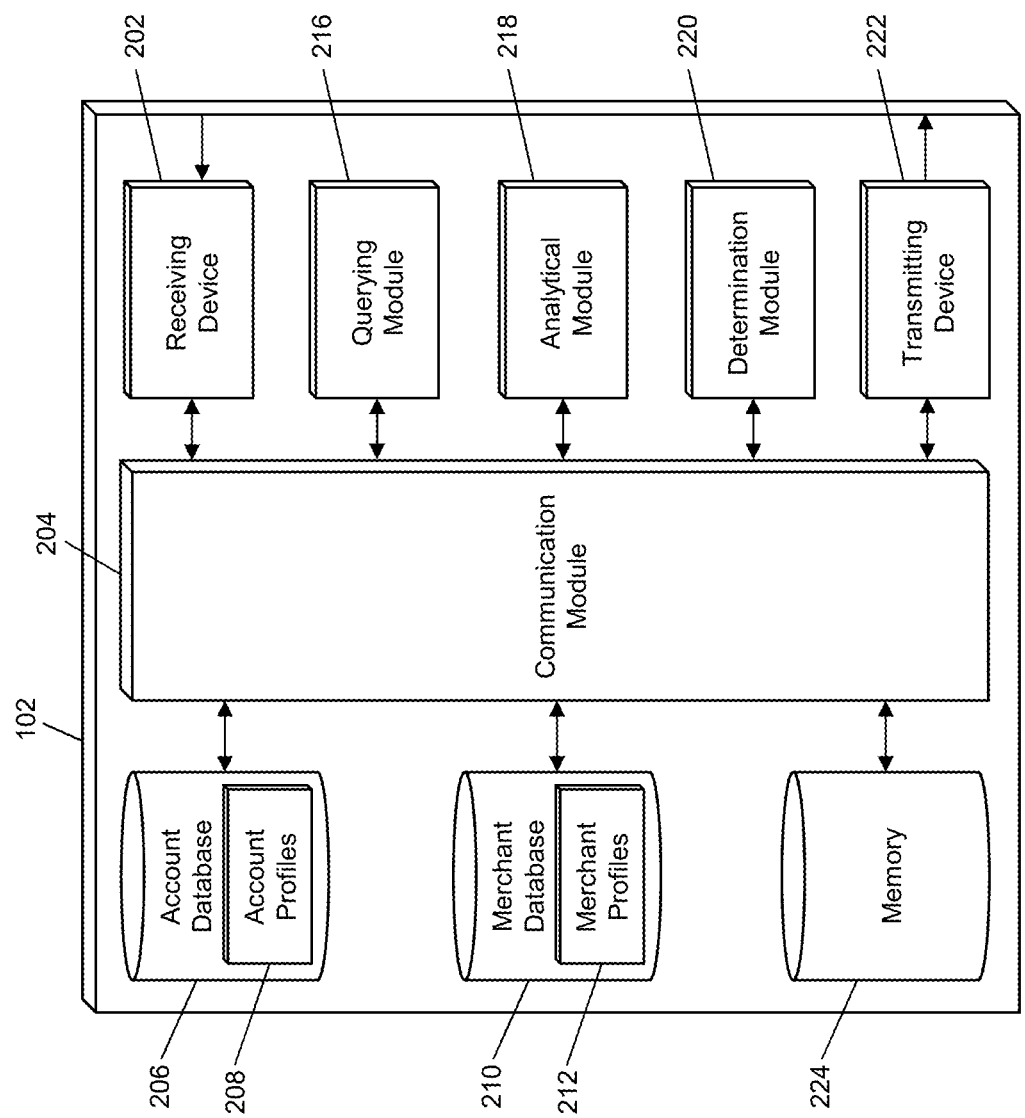
FIG. 2 is a block diagram illustrating the processing server of the system of FIG. 1 for the providing of insights based on merchant bidding in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from merchants 104, payment networks 110, individuals 106, and other systems and entities via one or more communication methods, such as local area networks, cellular communication networks, payment rails, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by merchants 104, which may be superimposed or otherwise encoded with merchant bids. Each merchant bid may include at least a merchant identifier and bid amount, and may also include information identifying a specific transaction metric to which the bid is directed, such as a unique value associated therewith. The receiving device 202 may also be configured to receive data signals electronically transmitted by payment networks 110, which may be superimposed or otherwise encoded with transaction data. In some cases, the receiving device 220 may receive transaction messages from the payment network 110 for payment transactions, which may be electronically transmitted via the payment rails associated therewith. In some embodiments, the processing server 102 may be a part of the payment network 110. In such embodiments, the receiving device 202 may receive the transaction data via internal communication networks of the payment network 110.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, analytical module 218, determination module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account use to fund electronic payment transactions. An account profile 208 may include at least an account identifier and a plurality of transaction data entries. The account identifier may be a unique value associated with the account profile 208 and/or related transaction account for identification thereof. Each of the plurality of transaction data entries may be related to a payment transaction and include at least a merchant identifier and other transaction data for the payment transaction.

The processing server 102 may include a merchant database 210. The merchant database 210 may be configured to store a plurality of merchant profiles 212 using a suitable data storage format and schema. The merchant database 210 may be a relational database that utilizes structured query language for the storage, identification, modifying, updating, accessing, etc. of structured data sets stored therein. Each merchant profile 212 may be a structured data set configured to store data related to a merchant 104 that may be eligible for bidding on transaction metrics. A merchant profile 212 may include at least the merchant identifier associated with the related merchant 104, and may also include additional data associated therewith for use in performing the functions discussed herein. For instance, a merchant profile 212 may be used to store merchant bids received from the related merchant 104, as identified via the associated merchant identifier.

The processing server 102 may include a querying module 216. The querying module 216 may be configured to execute queries on databases to identify information. The querying module 216 may receive one or more data values or query strings, and may execute a query string based thereon on an indicated database, such as the account database 206, to identify information stored therein. The querying module 216 may then output the identified information to an appropriate engine or module of the processing server 102 as necessary. The querying module 216 may, for example, execute a query on the account database 206 to identify an account profile 208 and the transaction data entries included therein for the identification of transaction metrics, or to execute a query on the merchant database 210 to identify merchant bids stored in merchant profiles 212 included therein related to a transaction metric that has met its threshold.

The processing server 102 may also include an analytical module 218. The analytical module 218 may be configured to perform analysis of data for the processing server 102 for the performance of functions discussed herein. The analytical module 218 may receive instructions as input, may perform the analysis as instructed, and may output results of the analysis to another module or engine of the processing server 102. In some instances, the input may include data to be used for the analysis. In other instances, the analytical module 218 may be configured to identify data used for analysis. For example, the analytical module 218 may be configured to analyze transaction data entries stored in an account profile 208 to identify transaction metrics for a transaction account, which may be based on the transaction data included therein. In such instances, the analytical module 218 may be configured to issue instructions to the querying module 216 to query the account database 206 for transaction data entries stored in a specific account profile 208, such as identified via the account identifier and where transaction data entries may be identified via merchant identifiers, merchant category codes, product data, etc.

The processing server 102 may also include a determination module 220. The determination module 220 may be configured to perform determinations for the processing server 102 in accomplishing the functions discussed herein. The determination module 220 may receive instructions as input, may perform determinations as instructed, and may output results of the analysis to another module or engine of the processing server 102. In some instances, the input may include data to be used for the determination. In other instances, the determination module 220 may be configured to identify data used for determinations. The determination module 220 may, for example, be configured to determine a winning bid of a plurality of merchant bids for a transaction metric based on at least the bid amount included in each merchant bid and the propensity for the associated individual 106 to transact with the related merchant 104, such as may be identified in the transaction metrics in the related account profile 208 and/or by the analytical module 218. The determination module 220 may also be configured to determine when transaction metrics have reached predetermined values or thresholds, such as based on transaction metrics stored in account profiles 208 and related predetermined values or thresholds, which may be stored with the transaction metrics or may be stored separately, such as in a memory 224 of the processing server 102.

The processing server 102 may also include a transmitting device 222. The transmitting device 222 may be configured to transmit data over one or more networks via one or more network protocols. In some instances, the transmitting device 222 may be configured to transmit data to merchants 104, payment networks 110, and other entities via one or more communication methods, such as local area networks, cellular communication networks, payment rails, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to merchants 104, which may be superimposed or otherwise encoded with transaction metrics and/or additional transaction account information, such as an account identifier for a transaction account for which the merchant 104 has won a bid. The transmitting device 222 may also be configured to electronically transmit data signals to payment networks 110, which may be superimposed or otherwise encoded with transaction data requests, such as to request transaction data for an individual 106 for which transaction data is needed for the identification of transaction metrics.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein.

Process for Delivering Insights Based on Merchant Bids

Figure 3:
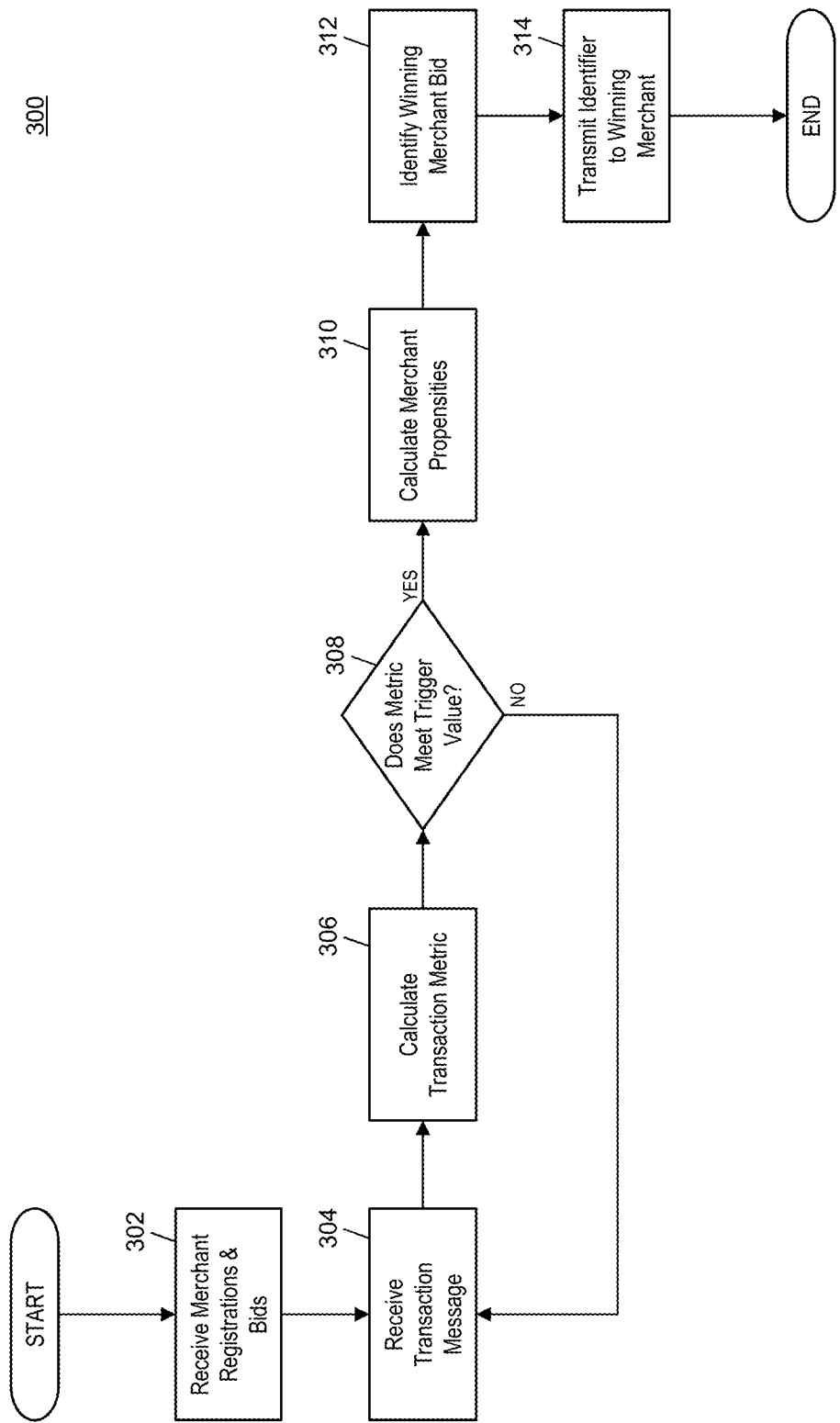
FIG. 3 is a flow diagram illustrating a process for the providing of individual insights based on merchant bidding and transaction propensities using the processing server of FIG. 2 in accordance with exemplary embodiments.

FIG. 3 illustrates a process 300 executed by the processing server 102 for the delivering of insights related to an individual's transaction metrics based on merchant bids submitted by a plurality of merchants 104 with whom the individual 106 previously transacted.

In step 302, the receiving device 202 of the processing server 102 may receive registration information and merchant bids from a plurality of different merchants 104. Registration information may include at least the merchant identifier associated with the respective merchant 104 and one or more account identifiers related to transaction accounts that have transacted with the respective merchant 104. In some instances, the merchant identifier may be supplied while the account identifiers may be identified via the querying module 216 of the processing server 102 executing queries on the account profiles 208 in the account database 206 to identify transaction accounts that include transactions involving the respective merchant 104 based on the merchant identifier. The merchant bids may each include the merchant identifier and a bid amount, and in some instances may also include a transaction metric or other information identifying thereof, to which the merchant bid is directed. The merchant bids and other merchant information may be stored in corresponding merchant profiles 212 in the merchant database 210 of the processing server 102 via queries executed by the querying module 216.

In step 304, the receiving device 202 may receive a new transaction message for a payment transaction processed by a payment network 110. The transaction message may be formatted pursuant to one or more standards, such as the ISO 8583 or 20022 standards, and may be received via payment rails associated with the payment network 110. The transaction message may include data elements configured to store at least an account identifier, a merchant identifier, and additional transaction data. The received transaction message may be stored in an account profile 208 that includes the account identifier stored in the transaction message via a query executed on the account database 206 by the querying module 216.

In step 306, the analytical module 218 of the processing server 102 may calculate new transaction metrics for the account profile 208 in which the received transaction message was stored. The transaction metrics may be calculated based on the transaction data entries stored in the account profile 208, including the transaction data entry for the newly received transaction message. In some instances, only transaction metrics related to the new payment transaction may be updated. For instance, in some cases, if the payment transaction is with a merchant dealing in jewelry, the transaction metrics for propensities for the related individual 106 to purchase sporting goods may be unaffected.

In step 308, the determination module 220 of the processing server 102 may determine if any of the updated transaction metrics meet a trigger value, where the trigger value may be stored in the corresponding account profile 208 or may be stored elsewhere in the processing server 102, such as the memory 224. If no trigger value has been met by any updated transaction metric, then the process 300 may return to step 304 where new transaction messages involving the account profile 208 may be awaited.

If a trigger value has been met, then, in step 310, the analytical module 218 of the processing server 102 may identify merchant propensities for the account profile 208 for each of the merchants 104 that submitted a merchant bid for the related transaction metric. The querying module 216 may execute queries on the merchant database 210 to identify merchant profiles 212 that include a merchant bid submitted for the transaction metric that met the trigger value, and may then execute queries on the account profile 208 to identify transaction data entries related to payment transactions involving each identified merchant 104 based on their corresponding merchant identifier. The analytical module 218 may then identify, for each merchant 104, a propensity for the individual 106 related to the transaction account to transact with the respective merchant 104 based on the transaction data. In some instances, the propensity may be specific to the transaction metric, such as in the above example where the propensity may be the propensity for the individual 106 to spend over $50 at the merchant 104 in the next 30 days when the transaction metric that met the trigger value was a propensity to spend over $50 on sporting goods in the next 30 days.

In step 312, the determination module 220 of the processing server 102 may determine a winning bid of each of the merchant bids submitted for the transaction metric. The winning bid may be based on at least the bid amount included in each submitted merchant bid and the merchant propensity identified for the corresponding merchant 104. In step 314, the transmitting device 222 of the processing server 102 may electronically transmit at least the account identifier for the account profile 208 for the transaction metric that met the trigger value to the merchant 104 that submitted the winning bid. The merchant 104 may then contact the individual 106 as a prior customer of the merchant 104 with the knowledge of the individual's propensity to transact.

Exemplary Method for Providing Insights Based on Merchant Bidding

Figure 4:
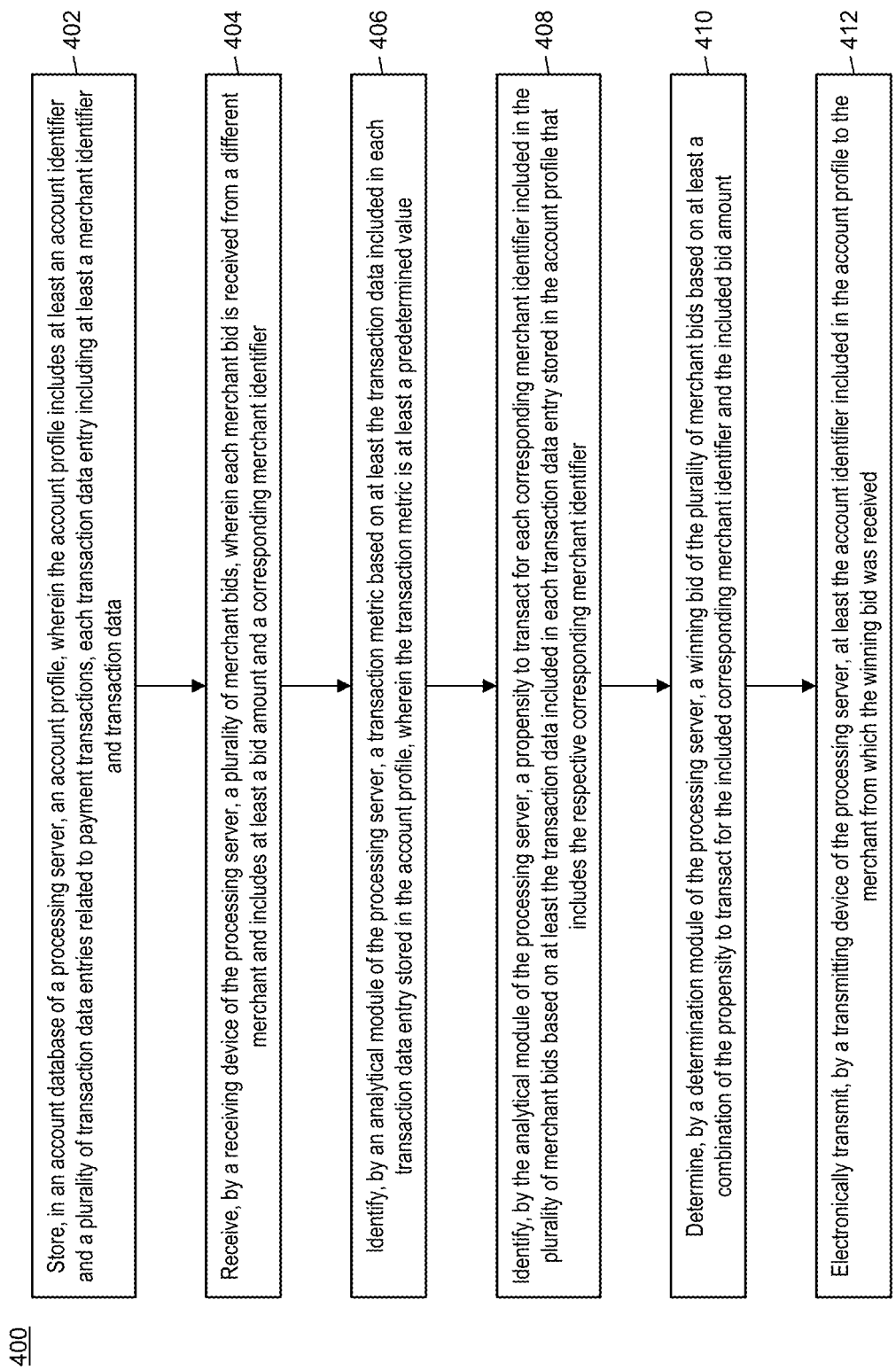
FIG. 4 is a flow chart illustrating an exemplary method for facilitating payment through an encoded link in accordance with exemplary embodiments.

FIG. 4 illustrates a method 400 for the providing of insights based on consumer transaction activity to one of a plurality of merchants based on a combination of bid amounts and the consumer's propensity to transact at each merchant.

In step 402, an account profile (e.g., account profile 208) may be stored in an account database (e.g., the account database 206) of a processing server (e.g., the processing server 102), wherein the account profile includes at least an account identifier and a plurality of transaction data entries related to payment transactions, each transaction data entry including at least a merchant identifier and transaction data.

In step 404, a plurality of merchant bids may be received by a receiving device (e.g., the receiving device 202) of the processing server, wherein each merchant bid is received from a different merchant (e.g., merchant 104) and includes at least a bid amount and a corresponding merchant identifier.

In step 406, a transaction metric may be identified by an analytical module (e.g., the analytical module 218) of the processing server based on at least the transaction data included in each transaction data entry stored in the account profile, wherein the transaction metric is at least a predetermined value. In step 408, a propensity to transact for each corresponding merchant identifier included in the plurality of merchant bids may be identified by the analytical module of the processing server based on at least the transaction data included in each transaction data entry stored in the account profile that includes the respective corresponding merchant identifier.

In step 410, a winning bid of the plurality of merchant bids may be determined by a determination module (e.g., the determination module 220) of the processing server based on at least a combination of the propensity to transact for the included corresponding merchant identifier and the included bid amount. In step 412, at least the account identifier included in the account profile may be electronically transmitted by a transmitting device (e.g., the transmitting device 222) of the processing server to the merchant from which the winning bid was received.

In one embodiment, the method 400 may further include receiving, by the receiving device of the processing server, a registration message from each of the different merchants, wherein the registration message includes at least the account identifier. In a further embodiment, the registration message may further include an indication of the transaction metric. In another further embodiment, the registration message may further include the predetermined value.

In some embodiments, the account identifier may be at least one of: a transaction account number, e-mail address, username, telephone number, and identification number. In one embodiment, each transaction data entry may further include a transaction date, and the propensity to transact for each corresponding merchant identifier may be further based on the transaction date included in each transaction data entry that includes the corresponding merchant identifier. In some embodiments, if the transaction metric is not greater than or equal to the predetermined value, the method 400 may further include: receiving, by the receiving device of the processing server, a new transaction data entry, wherein the new transaction data entry includes transaction data; and recalculating, by the analytical module of the processing server, the transaction metric based on at least the transaction data included in the new transaction data entry, wherein the recalculated transaction metric is greater than or equal to the predetermined value.

Computer System Architecture

Figure 5:
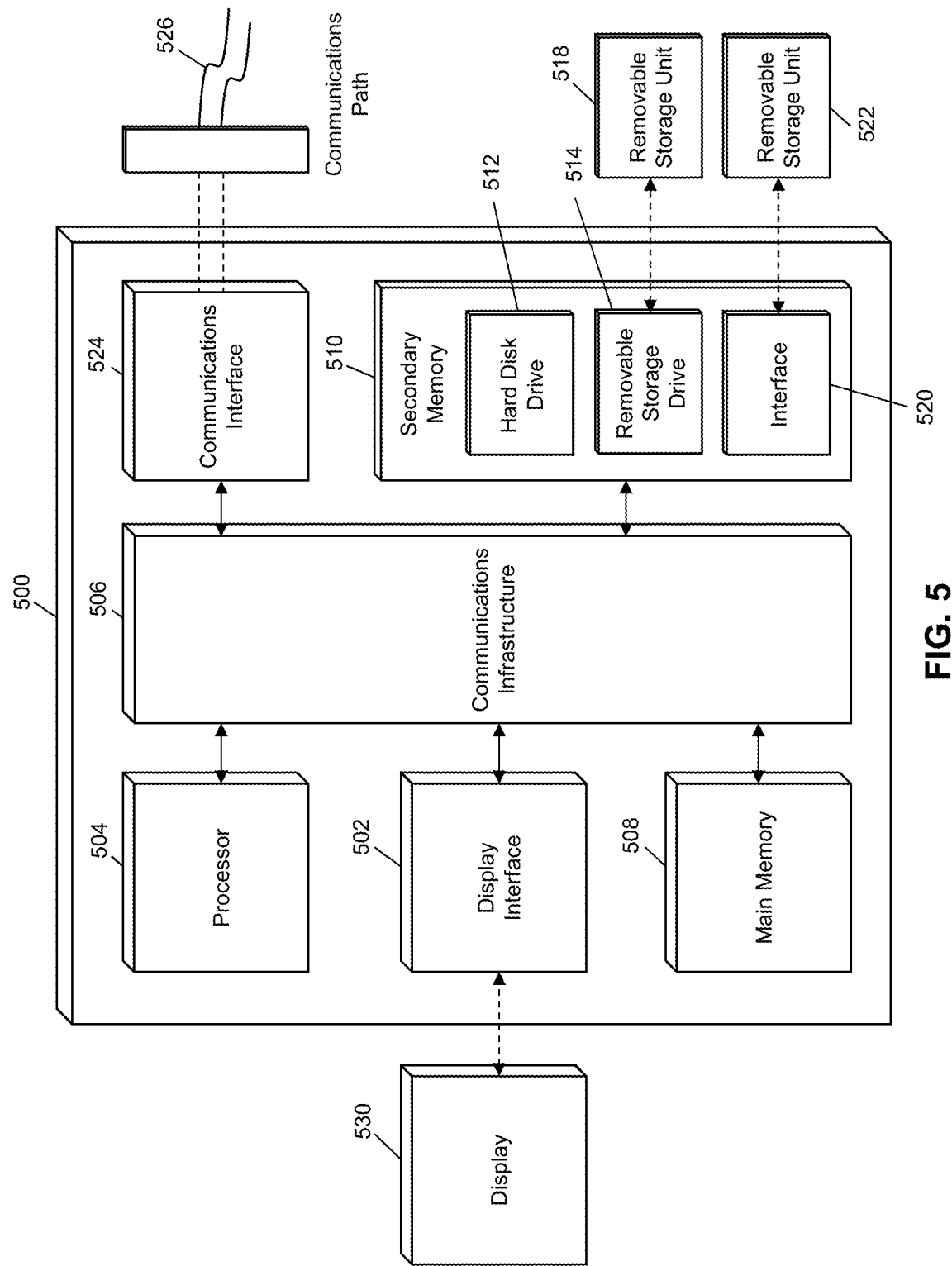
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for providing insights based on merchant bidding. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for providing insights based on merchant bidding, comprising:
    communicating, by a receiving device of a processing server, with specialized infrastructure associated with a payment network, and receiving therefrom payment transaction information associated with plurality of processed payment transactions;
    storing, in an account database of the processing server, an account profile, wherein the account profile includes at least an account identifier and a plurality of transaction data entries related to the plurality of processed payment transactions, each transaction data entry including respective payment transaction information received from the payment network including at least a merchant identifier and transaction data;
    receiving, by the receiving device of the processing server, a plurality of merchant bids, wherein each merchant bid is received from a different merchant and includes at least a bid amount and a corresponding merchant identifier;
    identifying, by an analytical module of the processing server, a transaction metric based on at least the transaction data included in each transaction data entry stored in the account profile, wherein the transaction metric is at least a predetermined value;
    identifying, by the analytical module of the processing server, a propensity to transact for each corresponding merchant identifier included in the plurality of merchant bids based on at least the transaction data included in each transaction data entry stored in the account profile that includes the respective corresponding merchant identifier;
    determining, by a determination module of the processing server, a winning bid of the plurality of merchant bids based on at least one of (1) a score that is determined on a basis of the propensity to transact for the included corresponding merchant identifier and the included bid amount, (2) a weighting of the propensity to transact for the corresponding merchant identifier and a weighting of the bid amount; and
    electronically transmitting, by a transmitting device of the processing server, at least the account identifier included in the account profile to the merchant from which the winning bid was received.

2. The method of claim 1, further comprising:
    receiving, by the receiving device of the processing server, a registration message from each of the different merchants, wherein the registration message includes at least the account identifier.

3. The method of claim 2, wherein the registration message further includes an indication of the transaction metric.

4. The method of claim 2, wherein the registration message further includes the predetermined value.

5. The method of claim 1, wherein the account identifier is at least one of:
    a transaction account number, e-mail address, username, telephone number, and identification number.

6. The method of claim 1, wherein
    each transaction data entry further includes a transaction date, and
    the propensity to transact for each corresponding merchant identifier is further based on the transaction date included in each transaction data entry that includes the corresponding merchant identifier.

7. The method of claim 1, wherein, if the transaction metric is not greater than or equal to the predetermined value, the method further comprises:
    receiving, by the receiving device of the processing server, a new transaction data entry, wherein the new transaction data entry includes transaction data; and
    recalculating, by the analytical module of the processing server, the transaction metric based on at least the transaction data included in the new transaction data entry, wherein
    the recalculated transaction metric is greater than or equal to the predetermined value.

8. The method of claim 1, further comprising:
    receiving, by the receiving device of the processing server, a set of merchant bids from a same merchant, wherein each merchant bid in the set of merchant bids has a different propensity to transact condition.

9. A system for providing insights based on merchant bidding, comprising:
    a receiving device of the processing server configured to communicate with specialized infrastructure associated with a payment network, and receive therefrom payment transaction information associated with plurality of processed payment transactions;
    an account database of the processing server configured to store an account profile, wherein the account profile includes at least an account identifier and a plurality of transaction data entries related to the plurality of processed payment transactions, each transaction data entry including respective payment transaction information received from the payment network including at least a merchant identifier and transaction data;
an analytical module of the processing server;
a determination module of the processing server; and
a transmitting device of the processing server, wherein
   the receiving device of the processing server is further configured to receive a plurality of merchant bids, wherein each merchant bid is received from a different merchant and includes at least a bid amount and a corresponding merchant identifier;
   the analytical module of the processing server is configured to
      identify a transaction metric based on at least the transaction data included in each transaction data entry stored in the account profile, wherein the transaction metric is at least a predetermined value, and
      identify a propensity to transact for each corresponding merchant identifier included in the plurality of merchant bids based on at least the transaction data included in each transaction data entry stored in the account profile that includes the respective corresponding merchant identifier;
   the determination module of the processing server is configured to determine a winning bid of the plurality of merchant bids based on at least one of (1) a score that is determined on a basis of the propensity to transact for the included corresponding merchant identifier and the included bid amount, and (2) a weighting of the propensity to transact for the corresponding merchant identifier and a weighting of the bid amount; and
   the transmitting device of the processing server is configured to electronically transmit at least the account identifier included in the account profile to the merchant from which the winning bid was received.

10. The system of claim 9, wherein the receiving device of the processing server is further configured to receive a registration message from each of the different merchants, wherein the registration message includes at least the account identifier.

11. The system of claim 10, wherein the registration message further includes an indication of the transaction metric.

12. The system of claim 10, wherein the registration message further includes the predetermined value.

13. The system of claim 9, wherein the account identifier is at least one of: a transaction account number, e-mail address, username, telephone number, and identification number.

14. The system of claim 9, wherein
   each transaction data entry further includes a transaction date, and
   the propensity to transact for each corresponding merchant identifier is further based on the transaction date included in each transaction data entry that includes the corresponding merchant identifier.

15. The system of claim 9, wherein, if the transaction metric is not greater than or equal to the predetermined value,
   the receiving device of the processing server is further configured to receive a new transaction data entry, wherein the new transaction data entry includes transaction data, and
   the analytical module of the processing server further configured to identify the transaction metric based on at least the transaction data included in the new transaction data entry, wherein
   the recalculated transaction metric is greater than or equal to the predetermined value.

16. The system of claim 9, wherein the receiving device of the processing server is further configured to receive a set of merchant bids from a same merchant, wherein each merchant bid in the set of merchant bids has a different propensity to transact condition.

* * * * *